3,260,686
ION EXCHANGE RESINS PREPARED FROM THE SAPONIFICATION OF COPOLYMERS OF THE N-VINYLIMIDES OF DICARBOXYLIC ACIDS AND A CROSS-LINKING AGENT CONTAINING AT LEAST TWO NON-CONJUGATED VINYLIDENE GROUPS

Hans Seifert, Bergisch Neukirchen, Herbert Corte, Leverkusen, and Otto Netz, Cologne, Germany, assignors to Farbenfabriken Bayer Aktiengesellschaft, Leverkusen, Germany, a corporation of Germany
No Drawing. Filed Aug. 8, 1961, Ser. No. 130,003
Claims priority, application Germany, Aug. 29, 1960,
F 31,991
9 Claims. (Cl. 260—2.1)

The present invention relates to ion exchange resins, preferably anion exchange resins, of the polyvinyl amine type as well as a process for production of such resins.

It is known to produce non-cross-linked polyvinyl amine by saponifying high molecular weight N-vinylimide polymers from dicarboxylic acids, such as N-vinylphthalimide, N-vinylsuccinimide (see in this connection, H. Hopff and B. Mühlethaler, "Kunststoffe, Plastics" 4 (1957, pages 257 to 264, and also a paper by R. Furter, "Zur Kenntnis der Vinylamine," Winterthur, 1956).

On the other hand, cross-linked polyvinyl amines, which would be of interest for the production of ion exchange resins of particularly high capacity, are so far unknown. The reason for this is apparently that one could hardly expect to obtain from a cross-linked poly-N-vinylimide, after saponification, ion exchange resins which show even only a grain strength which is approximately sufficient for this purpose, since the saponification reaction results in a great reduction in size of the molecule. For example, from N-vinyl-phthalimide, which is particularly readily available, and having a molecular weight of 173, there is obtained a reduction in the molecular weight after saponification to a value of approximately 43.

A process for the production of novel stable-grain ion exchangers with a particularly high exchange capacity, which ion exchangers are based on cross-linked polyvinyl amines has now been discovered. According to the present process, N-vinylimides of polycarboxylic acids preferably dicarboxylic acids are subjected, together with compounds being capable of cross-linking, i.e. carrying two or more vinyl groups, to block, solution, suspension or emulsion polymerization, using radical-forming catalysts, and the polymers which are obtained are saponified. According to a modification of the present process, additional compounds which carry one or more vinyl groups can be included in the copolymerization in order to increase the grain strength or stability of the ion exchangers to be prepared. According to yet another modification of the process according to the invention, it is possible to conduct the polymerization in the presence of other vinyl monomers which do not carry any exchange-active groups but, if desired, groups which can be transformed by saponification into exchange-active groups.

N-vinylimides of polycarboxylic acids, in particular N-vinylimides of aliphatic, cycloaliphatic or aromatic 1,2- as well as 1,3-dicarboxylic acids may be considered as suitable for the production of the polymers which can be saponified to form the ion exchangers according to the invention. The following compounds may be mentioned as representative examples thereof: N-vinylphthalimide, N-vinylsuccinimide, N-vinylglutarimide, N-vinylmaleinimide, N-vinylhexahydrophthalic acid imide, N-vinyl-$\Delta^4$-1-tetrahydrophthalic acid imide, N-vinyl-naphthalic acid imide and similar compounds as well as mixtures thereof with one another.

Monomers with a cross-linking action which may be considered for copolymerization with the aforementioned N-vinylimides are such which contain at least two non-conjugated vinylidene groups, $CH_2=C<$. Suitable copolymerizable cross-linking agents include the following divinylbenzene, divinyl toluene, trivinyl benzene, triallyl cyanurate, divinyl ether, 1,3,5-hexahydrotriacrylyl-s-triazine, ethylene glycol dimethacrylate, ethylene glycol diacrylate, divinyl sulfide, divinyl sulfone, diallyl phthalate, diallyl maleate, diallyl ether or mixtures thereof with one another. The proportion of the monomers with a cross-linking action in the monomer quantity to be used as a whole is generally 1–40%, advantageously 2–10%, in the case of difunctional cross-linking agents. If trifunctional cross-linking agents are used, it is advisable to use a correspondingly smaller quantity. Alkali-sensitive cross-linking agents, on the other hand, are employed in correspondingly larger quantities or in admixture with alkali-insensitive cross-linking agents. In certain cases, concentrations above or below the concentration limits indicated here and temperatures above and below the temperature limits hereinafter referred to may be employed.

The polymerization can be initiated both by light and heat, but particularly by the presence of conventional radical-forming catalysts. Examples of these catalysts are: organic peroxide compounds, such as acyl peroxides, for example, benzoyl peroxide, acetyl peroxide, lauroyl peroxide, 2,4-dichlorobenzoyl peroxide as well as mixed diacyl peroxides, such as acetalbenzoyl peroxide, propionylbenzoyl peroxide, alkyl peroxides, such as tert.-butyl hydroperoxide, cumene hydroperoxide, p-methane hydroperoxide, tertiary amyl peroxide and tertiary butyl hydroperoxide and ketone peroxides, such as methylethyl ketone peroxide as well as inorganic per compounds, such as potassium or ammonium persulphates, hydrogen peroxide or percarbonates, such as diethyl percarbonate, dipropyl percarbonate and alkali metal percarbonates, as well as alkali metal perborates and alkali metal phosphates. Organic nitrogenous compounds which split off radicals, such as azodiisobutyric acid dinitrile and like compounds, are obviously also to be considered. These catalysts especially to be envisaged are in this case preferably used in quantities of 0.1–3%, preferably 0.5–1.5%, based on the monomer fraction.

As polymerization temperatures, there are advantageously to be considered those in the range between 40 and 100° C., the temperature preferably being adapted to the auxiliary liquid being used at the time (further details in this connection are given below).

Depending on the polymerization processes used, it is possible to produce ion exchangers of this type with a gel structure or with a sponge structure.

The production of polymers with gel structure which can be saponified to the ion exchangers according to the invention can be effected in the simplest case without assistance of solvents, if the N-vinylcarboxylic acid imide to be used is liquid as the monomer within the temperature range of about 40–60° C., by subjecting said liquefied N-vinylimide to copolymerization with one of the aforementioned cross-linking agents in the presence of radical formers.

In other cases, i.e. when the N-vinylimide to be used is in solid form in the said temperature range, it is advisable to use a solution promoter. The following may be mentioned as examples of such solution promoters: aromatic hydrocarbons such as benzene, toluene and xylene; ethers, such as dichlorodiethylether and dioxane and chlorinated hydrocarbons or mixtures thereof with one another. In the case of bead polymerization (in which case attention must be paid to the insolubility of the solution promoter in water) preference is to be given to aromatic hydrocarbons. Said solution promoters are applied in amounts of from 30 to 100%, preferably 50 to 80% by weight, calculated on the total amount of monomers.

For the production of polymers which serve for obtaining ion exchangers with a sponge structure, the copolymerization of the N-vinylimide of a polycarboxylic acid with the cross-linking agent is carried out in the presence of about 20% up to 100%, preferably 30 to 70% by weight (based on the weight of the monomers) of an organic liquid which is able to dissolve the monomers but has no dissolving action or acts as a precipitant on linear polymers of aromatic vinyl compounds. Processes for the production of such ion exchangers with a sponge structure are described in detail in U.S. patent applications Serial Nos. 718,989, 727,045 and 750,560. Organic liquids of this particular type, in particular those which are preferably used in the production of bead polymers with a sponge structure, include petroleum fractions boiling between 100 and 140° C. (benzine) and between 160 to 196° C. (white spirit). In addition, it is obviously possible to use a large number of other organic liquids for this purpose, such as aliphatic or cycloaliphatic alcohols, for example cyclohexanol, methanol and amyl alcohol, aliphatic nitro compounds, such as nitromethane and nitrohexane and ethers such as diethylether, dibutylether or diamylether.

For the production of bead-shaped polymers, the solutions of the monomers are suspended in aqueous medium and then polymerized. In this case, it is preferred to use non-solvents which have only slight solubility in water, such as for example n-decanol, olein alcohol, aliphatic hydrocarbons such as white spirit or those which are preferentially dissolved in the monomer mixture, such as for example n-amyl alcohol.

The copolymerization of the aforesaid components can be effected by processes known per se, i.e. block, solution, suspension (bead) or emulsion polymerization. For the process of the present invention, which is especially concerned with the preparation of ion exchangers, polymerization in suspension is of particular importance, since the bead form of the polymer which is formed in this case has proved especially suitable for this purpose.

According to a modification of the present process, copolymerization with another third component is also possible. In such cases hydrocarbons carrying a single vinyl group, more especially aromatic vinyl hydrocarbons, such as styrene, alkylated styrenes, such as α-methyl styrene, vinyl toluene, vinyl naphthalene etc., as well as other monovinyl compounds not carrying any exchange-active groups, such as aliphatic monovinyl compounds as for example vinyl chloride, acrylonitrile or styrenes halogenated on the nucleus, as well as mixtures of these compounds etc. are especially to be considered.

Yet another modification of the present process is provided by copolymerization with monomers carrying a single vinyl group resp. vinylidene group and which are free from exchange-active groups, but which have groups which can be simply converted, for example by a saponification reaction, into exchange-active groups. Copolymerization with copolymerizable esters of acids having a terminal $CH_2=C<$-group such as acrylic, methacrylic and vinyl sulphonic acid with a saturated monohydric aliphatic alcohol having preferably of from 1 to 6 carbon atoms, such as methanol, ethanol, propanol, butanol etc., which renders possible the production of copolymers leading after saponification to amphoteric exchange resins may be mentioned, by way of example.

Although in principle any desired major proportion of such vinyl resp. vinylidene monomers is capable of being copolymerized, only such proportions are of value in practice with which on the one hand no appreciable lowering of the capacity of the exchangers obtained is observable, whilst on the other hand other properties, such as for example the grain stability, are favorably influenced. A range of 1–30% of copolymerizable vinyl monomers of the aforementioned type is of particular interest in this connection.

The copolymers carrying cross-linked vinylimide groups are thereafter subjected to saponification. The saponification can be effected with inorganic bases both in aqueous as well as in aqueous-alcoholic or alcoholic solution, under normal pressure and under elevated pressure. The following compounds can be employed as inorganic bases: sodium hydroxide and potassium hydroxide solutions, barium hydroxide, lime water, hydrazine and others. It is also possible readily to hydrolize using organic bases, such as trimethylamine, triethylamine or their quaternary bases and ethanolamine, diethanolamine and triethanolamine. Saponification can also be effected with acidic agents, for example hydrochloride, sulphuric, phosphoric acids and other acids. The saponification agents are generally used in an excess, calculated on the quantity theoretically necessary. The temperatures to be maintained are between room temperature and 100° C., but 100° C. can be exceeded when working under pressure.

The exchange resins with primary amino groups obtained by the present process can be converted by various conventional processes, for example by chloromethylation with or without pressure, treatment with dimethyl sulphate and in particular by treatment with formic acid-formaldehyde mixtures, into their tertiary amine form, or can be quaternized by suitable further treatment, for example with chloromethyl sulphate. It is possible for this purpose to use alkylation agents which are known per se, for example alkyl halides (methyl-chloride, ethylbromide, butylbromide), dialkyl sulphates (dimethylsulphate, diethylsulphate), alkylene oxides (ethylene oxide, propyleneoxide), halohydrins (ethylene chlorohydrin, propylenechlorohydrin, glycerolchlorohydrin), polyhalogen compounds (ethylenechloride, ethylenebromide, 1,4-dibromobutane, glyceroldichlorohydrin) or epihalohydrins (epichlorohydrin, epibromohydrin). The alkylation is effected by reacting the aforementioned amino derivatives with the alkylatnig agents which are preferably in a molar surplus at temperatures of about 20 to 120° C. if necessary in the presence of a diluent such as water, alcohol (methanol, ethanol) and of an alkaline agent such as caustic alkalis (NaOH, KOH), MgO, CaO, organic bases.

The present process is particularly characterized by the fact that it is possible in accordance therewith to obtain exceptionally solid bead polymers without any damage to the grain. An additional important advantage of the exchangers obtained is that by comparison with known anion exchangers, for example those based on chloromethylated and subsequently animated polystyrene, they show a substantially higher capacity with a lower amount of dry substance, related to the swelled exchanger, namely, because of a matrix with a considerably lower molecular weight or a high content of exchange-active nitrogen in the exchange resin. With equal capacities, the dry substance of the exchangers according to the invention is in the region of 20–30 g./100 cc. of moist exchanger, by comparison with 40–50 g./100 cc. of moist exchanger consisting of chloromethylated and aminated polystyrene.

EXAMPLE 1

254 g. of N-vinylphthalimide, 46 g. of divinyl benzene (53%) and 2 g. of benzoyl peroxide (75%) are dissolved at 60° C. in 100 cc. of benzene and added to 1000 cc. of a 1% solution of size in water, the solution also being at 60° C. Polymerization is carried out for 3 hours at 60° C., the temperature is thereafter raised to 80° C. and this temperature is maintained for another 16 hours. The benzene is then distilled off and the bead polymer which has formed is separated out by means of a suction filter and washed. Dry yield 295 g.

In the foregoing procedure instead of 46 g. of divinyl benzene an amount of 30 g. of 1,3,5-hexahydrotriacryloyl-s-triazine may be employed.

Saponification 295 g. of the bead polymer obtained in the manner indicated above are treated with 900 cc. of hydrazine hydrate in a three-necked flask while stirring for 16 hours at 120° C. The contents of the flask are diluted with water and the reaction product is separated with the aid of a suction filter and washed.

Yield: 510 cc. of an anion exchanger with a total capacity of 10.7 mval./g. of dry substance.

EXAMPLE 2

A solution of 145 g. of N-vinylphthalimide, 5 g. of divinyl benzene (58%), 1 g. of cumene hydroperoxide (75%) in 50 cc. of benzene, which solution has a temperature of 65° C., is introduced into 500 g. of an aqueous 1% solution of gelatine, which is likewise at 65° C. The temperature is initially kept for 3 hours at 65° C., is thereafter raised to 80° C., kept at 80° C., for another 16 hours and thereafter the benzene is distilled off. The bead-like residue is treated with hydrazine in accordance with the information given in Example 1 and the prepared exchanger beads are separated by suction filtering and washed. The product has a total capacity of 20.5 mval./g. of dry substance.

EXAMPLE 3

500 g. of an aqueous solution of 0.1% of 124 grams of N-vinyl phthalimide, 26 grams of divinyl benzene (58%), 1 gram of benzoylperoxide, plus methyl cellulose are combined at 70° C. with a solution consisting of 50 cc. of benzene (58%) as well as 2 g. of azodiisobutyric acid dinitrile, heated for 3 hours to 70° C. and bead polymerization is continued for another 16 hours at 80° C. while stirring well. After distilling off the benzene, the bead polymer is separated by suction filtering, washed and dried at 100° C. 60 g. of this product are treated with hydrazine in a manner corresponding to that described in Example 1. There obtained 90 cc. of an exchanger ready for use and having a total capacity of 8.75 mval./g. of dry substance.

In the foregoing procedure instead of 26 g. of divinyl benzene, 15 g. of trivinyl benzene may be employed.

EXAMPLE 4

114 g. of N-vinylphthalimide, 15 g. of styrene, 21 g. of divinyl benzene (53%) and 1 g. of benzoyl peroxide are dissolved at 60° C. in 35 cc. of benzene and poured into a solution of 0.5 g. of methyl cellulose in 500 g. of water, the latter solution also being at 60° C. The temperature of 60° C., is maintained for 3 hours while stirring (210 r.p.m.) and polymerization is completed within 16 hours at 80° C. The benzene is then distilled off and the remaining residue in bead form is separated out by a suction filter and washed, and after being dried, is treated with hydrazine in accordance with Example 1. There are obtained from 148 g. total yield of bead polymer, a total of 180 cc. of hydrazinolyzed material, which has excellent grain stability.

The total capacity is 9.05 mval./g. of dry substance. In another experiment similar to that described before instead of 15 g. of styrene as further vinyl monomer, 15 g. vinyltoluene were employed without disadvantages.

EXAMPLE 5

90 g. of formic acid and 80 g. of formaldehyde solution (40%) are poured onto 100 cc. of an anion exchanger in the hydroxyl form obtained according to Example 1, the temperature initially being raised to 80° C., and then to 90° C., after 1 hour. At this temperature, stirring is continued for another 16 hours and the residue is then collected on the suction filter.

The anion exchanger thus obtained and containing tertiary amino groups shows a total capacity of 8.26 mval./g. of dry substance.

EXAMPLE 6

The bead product according to Example 2 is treated in a manner similar to that indicated in Example 5 with formic acid in formaldehyde and the primary amine is converted into the tertiary form. The total capacity is 12.0 mval./g. of dry substance.

EXAMPLE 7

A solution of 42.3 g. of N-vinyl succinimide, 7.72 g. of divinyl benzene (52%) and 0.70 g. of benzoyl peroxide (75%) is added at room temperature to 100 g. of an aqueous solution containing 0.10 g. of methyl cellulose. While stirring, the temperature is kept for 3 hours at 60° C., then at 80° C. for 16 hours and finally at 95° C. for 2 hours. After the hydrazinolysis, there are obtained from 33 g. of bead polymer, a total of 60 cc. of a practically colorless anion exchanger, the total capacity of which is 5.83 mval./g. of dry substance.

EXAMPLE 8

30 g. of the product obtained according to Example 1 are treated with 10 times the quantity of a 20% sodium hydroxide solution in an autoclave for 3 hours at 170–175° C., under a pressure of 6 atm. gauge. The washed product has a total capacity of 10 mval./g. of dry substance.

EXAMPLE 9

A solution of 129 g. of N-vinylphthalimide, 21 g. of divinyl benzene (53%), 75 g. of white spirit (boiling limits 148–180° C.) and 1 g. of benzoyl peroxide (75%) is subjected to bead polymerization with 500 cc. of a 1% aqueous suspension of talcum for 3 hours at 60° C. and 16 hours at 80° C. After saponification, a white anion exchanger with a sponge structure is obtained which has a total capacity of 10 mval./g. of dry substance.

EXAMPLE 10

10 g. of dry exchanger, obtained according to Example 5 are stirred with 50 cc. of benzene and 25 cc. of dimethyl sulphate for 16 hours at 80° C. and then washed. A strongly basic anion exchanger is obtained, which is able to split neutral salts and has a total capacity of 5.40 mval./g. of dry substance.

What we claim is:

1. A process for preparing ion-exchange resins which comprises copolymerizing a vinylimide of a dicarboxylic acid in the presence of a cross-linking monomer containing at least two non-conjugated $CH_2=C<$ moieties; said monomer being a member selected from the group consisting of divinylbenzene, divinyl toluene, trivinyl benzene, triallyl cyanurate, divinyl ether, 1,3,5-hexahydrotriacrylyl-s-triazine, ethylene glycol dimethacrylate, ethylene glycol diacrylate, divinyl sulfide, divinyl sulfone, diallyl phthalate, diallyl maelate, and diallyl ether; in the presence of an active amount of a polymerization catalyst, said cross-linking monomer being present in an amount of 1 to 40 percent by weight of the monomer quantity to be used as a whole, saponifying the resulting copolymer and recovering the resin product.

2. The process of claim 1 wherein styrene is additionally added employed as a cross-linking monomer in an amount not exceeding 30 percent by weight of the amount of monomer quantity to be used as a whole.

3. The process of claim 1, wherein the N-vinylimide of a dicarboxylic acid is N-vinylsuccinimide.

4. The process of claim 1, wherein the N-vinylimide of a dicarboxylic acid is N-vinylphthalimide.

5. The process of claim 1 wherein the cross-linking monomer is divinyl benzene.

6. The process of claim 1 wherein the saponification is effected with an inorganic base.

7. The process of claim 1, wherein the saponification is effected with sodium hydroxide as a hydrolytic agent.

8. The process of claim 1, wherein the saponification is effected with hydrazine hydrate as a hydrolytic agent.

9. The ion exchange resin prepared according to claim 1.

References Cited by the Examiner

UNITED STATES PATENTS

| | | | |
|---|---|---|---|
| 2,365,340 | 12/1944 | Hanford | 260—96 |
| 2,817,645 | 12/1957 | Weisgerber | 260—17.4 |
| 2,912,439 | 11/1959 | Hasek | 260—78 |
| 3,068,190 | 12/1962 | D'Alelio | 260—2.1 XR |

WILLIAM H. SHORT, *Primary Examiner.*

HAROLD BURSTEIN, *Examiner.*

C. A. WENDEL, J. C. MARTIN, *Assistant Examiners.*